July 21, 1936. G. ADOLFSON 2,048,313
FIXTURE
Filed April 27, 1936 2 Sheets-Sheet 1

Inventor
Gunnar Adolfson
by Henry Mesh
Attorney

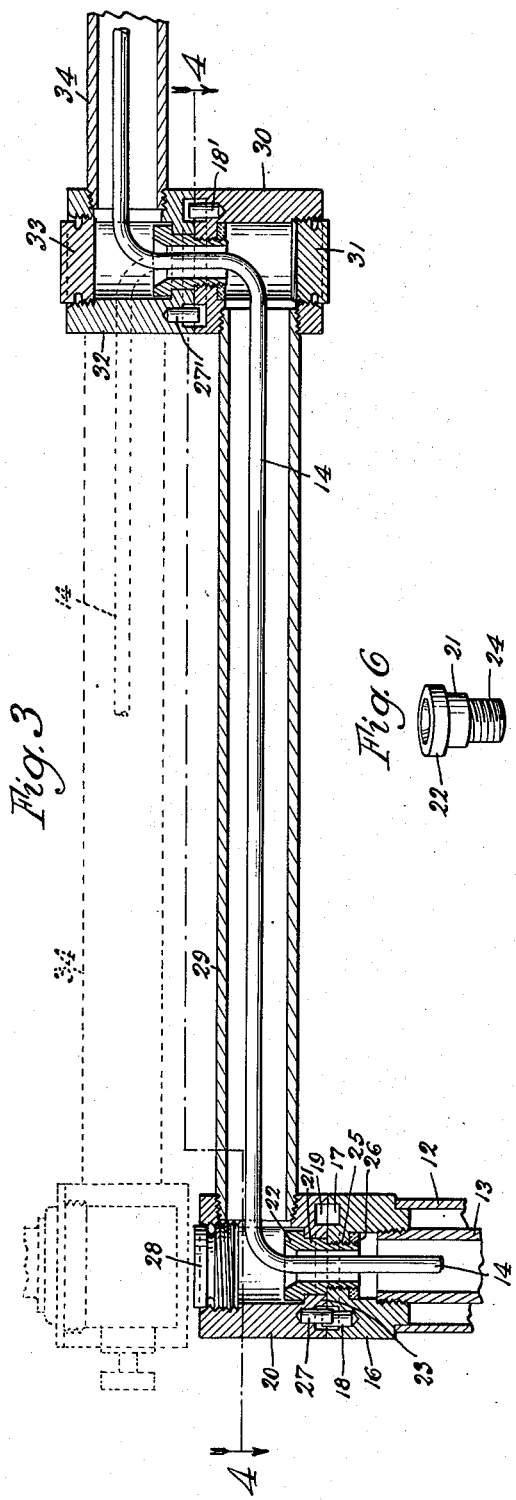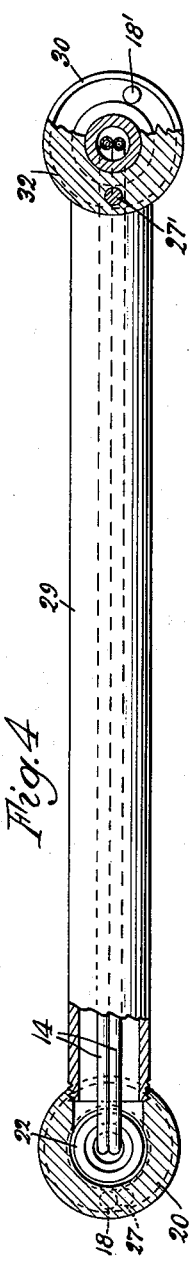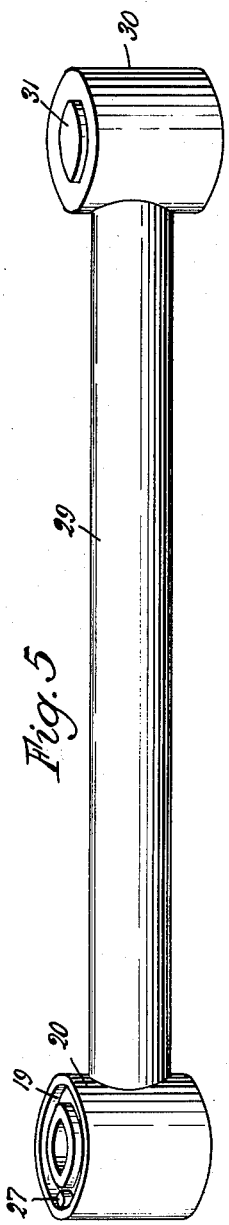

Patented July 21, 1936

2,048,313

UNITED STATES PATENT OFFICE 2,048,313

FIXTURE

Gunnar Adolfson, Chicago, Ill., assignor to Rindsberger Manufacturing Corporation, a corporation of Illinois Application April 27, 1936, Serial No. 76,558

3 Claims. (Cl. 248—122)

The invention relates to fixtures or brackets to be used for the support of an article.

It is an object of the invention to provide a double-arm bracket having a rotary joint between the arms such that the arms always remain in contact with one another, under constant pressure, to preclude the joint from becoming loose.

It is also an object to provide a fixture carrying a lamp and enabling said lamp to be swung selectively about one of two axes but preventing the wiring to become twisted.

With these and other equally important objects in view, which will become apparent from a perusal of the invention, the latter comprises the means described in the following specification, particularly pointed out in the claims forming a part thereof, and illustrated in the accompanying drawings, in which:

Fig. 3 is a section through the bracket for the lamp.

Fig. 4 is a section on the line 4—4 of Fig. 3.

Fig. 5 is a perspective view of the bracket arm, and

Fig. 6 is a perspective view of a bushing.

Figures 1, 2:
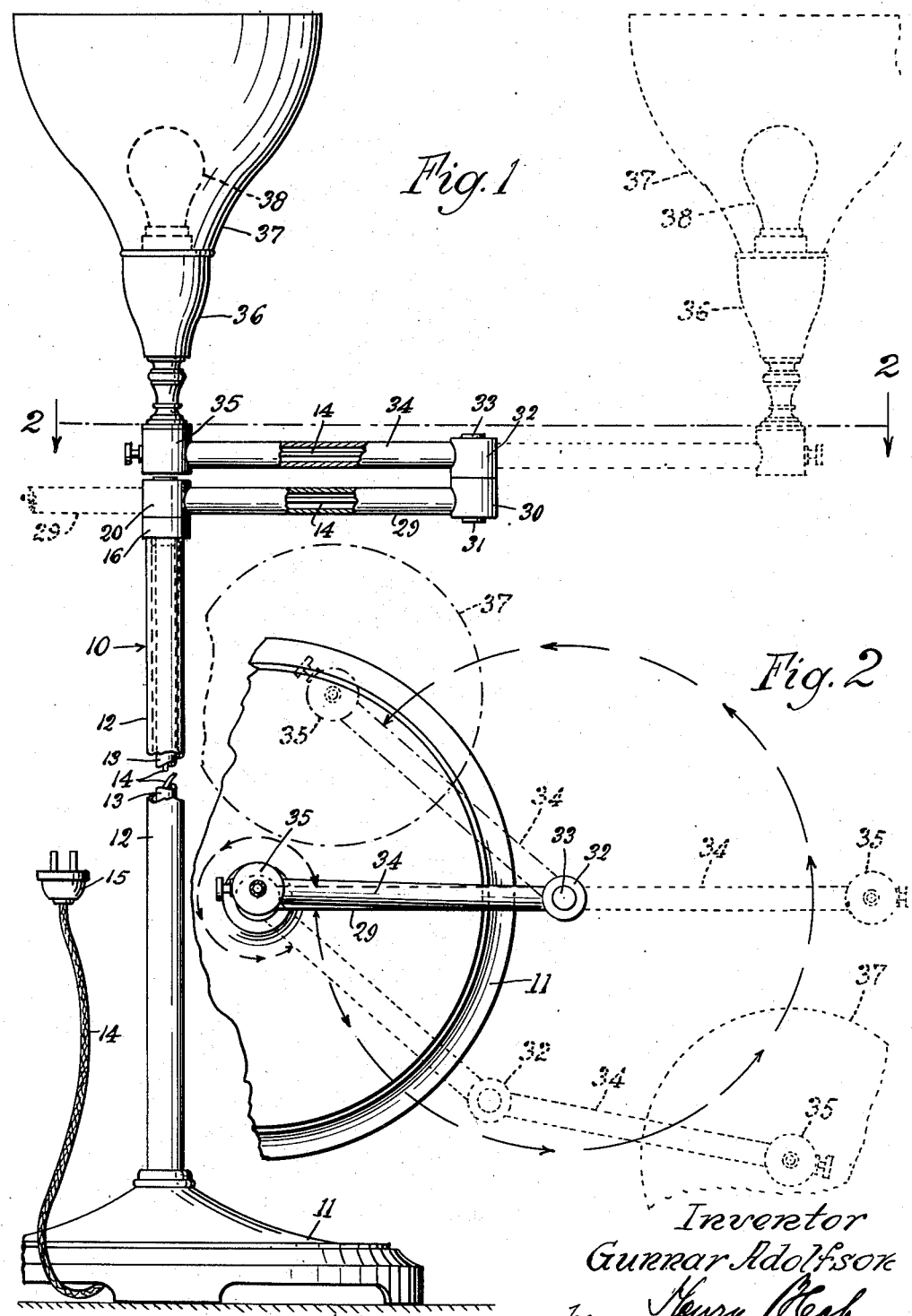
Fig. 1 is an elevational view of a lamp constructed in accordance with my invention.
Fig. 2 is a section on the line 2—2 of Fig. 1.

In the embodiment shown in the drawings, the fixture is shown in connection with a lamp, but may be used wherever motion of an article within a restricted area is required.

Referring to the several views in the drawings, 10 generally designates a lamp of the floor stand type which comprises a base 11 from which upstands a central post 12 in the form of a tube surrounding a pipe 13 concentric thereto. Wires 14 terminate in a plug 15 which is applied to the usual socket constituting a source of electrical energy.

The upper end of the tube 12 fits in a circumferential recess of an annular member 16 provided at the inner bore with threads to be screwed home on the pipe 13. The annular member 16 is formed with an annular groove 17 in which a pin 18 is provided for a purpose hereinafter disclosed. The groove 17 is in juxtaposition to a groove 19 of an annular member 20, which is rotatably secured to the annular member 16 by a bushing 21 whose head 22 rests on a shoulder 23 of member 20 and whose body position 24 is threaded into an opening 25 at the top of the member 16, which opening is narrower than the bore of said member. Solder 26 between the depending part of the bushing and the wall of member 16 prevents the joint formed by the annular members 16, 20 to become loose or separated.

A pin 27 in the groove 19 limits the rotation between the joint members 16 and 20 by coming in contact with the pin 18. The annular member 20 is closed at the top by a plug 28 and has secured to its side the threaded end of a horizontal tube 29 which at the other end is threaded into an opening of an annular member 30 closed at the bottom by a plug 31 and secured for rotation to another annular member 32, which is closed at the top by a plug 33.

The joint formed by the members 30 and 32 is of similar construction as the previously described joint so that a further description thereof is deemed superfluous. The member 32 has the horizontal tube 34 threaded thereto which leads to a bearing member 35 carrying a holder 36 for the support of a reflector 37 which surrounds a bulb 38.

Attention is called to the fact that the member 32 has a pin 27' and the member 30 has a pin 18' for the purpose of limiting rotation of the tubes 29 and 34. The wires 14 extend through the bushing 21, through the tube 29 and thence through the members 30 and 32 into the tube 34 to finally connect with the terminal contacts of the socket carrying the bulb 38.

The use of the fixture carrying the lamp is thought to be obvious. The upper part of the lamp may be swung around in a circle with the joints 30 and 32 as a central axis and again the lamp may be swung around in a circle with the post 12 as a central axis, so that illumination may be had over a wide area, without the necessity of moving the base of the lamp.

While the drawings show a preferred embodiment of the invention, various changes and inaugurations can be made without departing from the spirit of the invention. I, therefore, do not limit myself to the details of construction and arrangement, as shown, but wish to include all revisions, modifications and alterations constituting departures within the scope of the invention, as defined in the appended claims.

I claim:

1. In a double-arm bracket for a light standard, a rotary joint between the arms of said bracket comprising a pair of annular members, one of said members being counterbored to provide a seat, a headed nipple resting with its head on said seat and in threaded connection with said other annular member, and means on the threaded end of said nipple to fuse it to said other annular member so that the latter together with said nipple form an integral structure to cause the nipple head to rotate on the counterbored seat of said one annular member.

2. In a double-arm bracket for a light standard, a rotary joint between the arms of said bracket comprising a pair of annular members, one of said members being counterbored to provide a seat, a headed nipple resting with its head on said seat and in threaded connection with said other annular member, and means on the inner end of said nipple to prevent its rotation relative to said other annular member so that the latter together with said nipple form an integral structure to cause the nipple head to rotate on the counterbored seat of said one annular member.

3. A lamp support comprising a standard, an arm swingably mounted on the standard, a second arm swingably mounted on the end of the first arm, a lamp supported on the end of the second arm, the joints between the arms and the standard comprising a pair of annular members, one of said members being counterbored to provide a seat, a headed nipple resting with its head on said seat and in threaded connection with said other annular member, and means on the threaded end of said nipple to fuse it to said other annular member so that the latter together with said nipple form an integral structure to cause the nipple head to rotate on the counter-bored seat of said one annular member.

GUNNAR ADOLFSON.